(12) United States Patent
Ng

(10) Patent No.: US 6,474,810 B1
(45) Date of Patent: Nov. 5, 2002

(54) BRIDGE FOR ATTACHING AUXILIARY LENSES

(76) Inventor: Dave Ng, c/o Fuji Optical Co. Ltd., 7300 Warden Avenue, Suite 103, Markham, Ontario (CA), L3R 9Z6

( * ) Notice: Subject to any disclaimer, the term of this patent is extended or adjusted under 35 U.S.C. 154(b) by 0 days.

(21) Appl. No.: 09/699,391

(22) Filed: Oct. 31, 2000

(51) Int. Cl.[7] .................................. G02C 9/00
(52) U.S. Cl. ................................. 351/47; 351/57
(58) Field of Search ........................... 381/47, 48, 57, 381/58, 44, 81

(56) References Cited

U.S. PATENT DOCUMENTS

| | | | |
|---|---|---|---|
| 4,070,103 A | 1/1978 | Meeker | |
| 4,247,178 A | * 1/1981 | Cook | 351/47 |
| 4,890,910 A | 1/1990 | Gazeley | |
| 4,955,707 A | 9/1990 | Gazeley | |
| 4,973,148 A | 11/1990 | Gazeley | |
| 5,335,025 A | 8/1994 | Wang | |
| 5,416,537 A | 5/1995 | Sadler | |
| 5,438,378 A | 8/1995 | Blatter | |
| 5,493,348 A | 2/1996 | Hearld, Jr. et al. | |
| 5,568,207 A | 10/1996 | Chao | |
| 5,642,177 A | 6/1997 | Nishioka | |
| 5,696,571 A | 12/1997 | Spencer et al. | |
| 5,737,054 A | 4/1998 | Chao | |
| 5,867,244 A | 2/1999 | Martin | |
| 5,880,805 A | 3/1999 | Naessens et al. | |
| 5,883,689 A | 3/1999 | Chao | |
| 5,907,384 A | 5/1999 | Kirsch et al. | |
| 5,929,964 A | 7/1999 | Chao | |
| 5,975,691 A | 11/1999 | Ku | |
| 6,053,611 A | 4/2000 | Ku | |
| 6,089,708 A | 7/2000 | Ku | |
| 6,109,747 A | 8/2000 | Chao | |

FOREIGN PATENT DOCUMENTS
[0003]/

| | | |
|---|---|---|
| CA | 2168086 | 8/1996 |
| CA | 2180714 | 5/1997 |
| CA | 2223295 | 6/1998 |
| CA | 2235917 | 7/1998 |
| CA | 2235088 | 10/1998 |
| CA | 2235798 | 10/1998 |
| CA | 2235897 | 11/1998 |
| CA | 2236025 | 4/1999 |
| DE | 43 16 698 | 11/1994 |
| JP | 1995/128620 | 5/1995 |
| TW | 78209045 | of 1989 |
| WO | WO 90/09611 | 8/1990 |
| WO | WO 99/47965 | 9/1999 |

OTHER PUBLICATIONS

Eclips instruction card, Emeryville, California, undated.
ColorClip brochure, Regency Enterprise, Markham, ON, Canada, undated.

* cited by examiner

Primary Examiner—Hung Xuan Dang
(74) Attorney, Agent, or Firm—Ridout & Maybee LLP

(57) ABSTRACT

An auxiliary spectacle apparatus is provided wherein auxiliary lenses have a mechanical bridge fastener for releasably engaging the bridge portion of the primary frames in a manner which provides security of attachment in all directions.

11 Claims, 4 Drawing Sheets

BRIDGE FOR ATTACHING AUXILIARY LENSES

FIELD OF THE INVENTION

The invention relates to mechanical means by which auxiliary lenses are attached to spectacles at the bridge.

BACKGROUND OF THE INVENTION

A spectacle frame having an attachable one-piece slide-on rim is disclosed in U.S. Pat. No. 4,070,103 to Meeker. In Meeker, a spectacle frame includes a magnetic material secured to the front face of the frame for facilitating attachment of an auxiliary frame. The lens rim cover also includes a magnetic strip for engaging with the magnetic material of the spectacle frame.

Other typical auxiliary eyeglass attachments are disclosed in U.S. Pat. No. 5,416,537 to Sadler, U.S. Pat. No. 5,737,054 to Chao, U.S. Pat. No. 5,975,961 to Ku, Canadian patent application No. 2,180,714 to Chao, Canadian patent application No. 2,235,897 to Chao, Canadian patent application No. 2,236,025 to Ku, Canadian patent application No. 2,223,088 to Madison, U.S. Pat. No. 5,568,207 to Chao, Canadian patent No. 2,223,295 to Chao, German patent application No. DE 43 16 698 to Karp, PCT application No. WO 026718 to Zelman, Canadian patent application No. 2,235,917 to Chao, U.S. Pat. No. 6,542,177 to Nishioka, and PCT application no. WO 9009611 to Stemme. In all cases, the auxiliary lenses are attached to the frames by magnetic materials.

The use of magnets to attach auxiliary lenses has several drawbacks. The strength of magnets weakens over time. In addition, magnetic attachment means are only effective in association with selected metal frames, unless magnets are embedded in the frames of the eyeglasses.

This requires cavities in the frames for engaging with the magnetic members such that the strength of the frames is compromised. Also, there is some literature which suggests that magnets placed near the body may alter body chemistry or physiology.

U.S. Pat. No. 6,053,611 to Ku teaches auxiliary glasses with magnets located on upper and lower flanges which extend backwardly to the primary bridge, which is also equipped with upper and lower magnets corresponding to the auxiliary glasses magnets. The insertion of four magnets into a this confined space is difficult and therefor costly. Also, as discussed above, there are several other drawbacks associated with the use of magnets in eyeglasses. As the strength of the magnets weakens, the design taught by Ku will become ineffective.

One magnet-free method of attaching auxiliary lenses that has attempted to address these problems is the ColorClip™ system. This system provides for holes drilled at various places around the outer perimeter of the auxiliary lenses. Soft plastic clips are then inserted into the holes. A similar system, ECLIPS, requires that the lenses be scored, coated with primer and glue, and rely on metal clips on the auxiliary spectacles. In both systems, the clips engage the primary spectacles. The use of these clip systems creates the risk that drilling, scoring, gluing or attaching the clips will damage the auxiliary lenses in positions, such as the upper, lower and lateral portions of the lenses, that tend to impair vision. Furthermore, each auxiliary lense must be separately attached to and removed from the primary frames. In use, the presence of the clips on the lenses may obscure vision. Also, many wearers consider the clips to be unsightly or unappealing.

Thus, it would be desirable to have a means for attaching auxiliary lenses to primary spectacles which did not rely on magnets, and did not require placement of clips on the lenses.

SUMMARY OF THE INVENTION

The present invention provides a spectacle apparatus having: (a) a primary frame adapted for fitting on a wearer's head, the primary frame having a primary bridge medial in the primary frame; (b) a ridge extending forward from the primary bridge; (c) an indentation on a horizontal surface on the ridge; (d) two auxiliary lenses; (e) an auxiliary bridge extending between and connecting the auxiliary lenses to each other; (f) an upper projection extending rearward from the auxiliary bridge and a lower projection extending rearward from the auxiliary bridge; and (g) at least one protrusion on at least one of the projections, the protrusion configured for releasably inserting into the indentation, and the at least one the projection is elastic.

In one embodiment the spectacle apparatus has protrusions on both the projections, and the protrusions are configured for releasably inserting into at least one indentation on the ridge. In another embodiment, there are protrusions on both the projections, and the protrusions extend laterally in correspondence with at least one the indentation for releasably inserting into the indentation. In a further embodiment, the at least one protrusion extends laterally in correspondence with the indentation for releasably inserting into the indentation. In another embodiment, the indentation on the ridge extends laterally. The indentation on the ridge can be a hole through the ridge.

In an embodiment, the ridge has a ridge vertical face which extends laterally and the auxiliary bridge has an rearward vertical auxiliary bridge face which extends laterally and the faces are configured such that an interference fit between the faces prevents horizontal rotation between the primary spectacle and the auxiliary bridge. In another embodiment, the ridge has a horizontal ridge face which extends laterally and at least one projection has a projection face which extends laterally and the faces are configured such that an interference fit between the faces prevents vertical rotation between the primary spectacle and the auxiliary bridge. In a further embodiment, the ridge has a horizontal ridge face which extends laterally and at least one projection has a projection face which extends laterally and the faces are configured such that an interference fit between the faces prevents vertical rotation between the primary spectacle and the auxiliary bridge.

The protrusion may be beveled. The auxiliary bridge may be made from Polyflex™ plastic or memory plastic.

The invention also provides an auxiliary spectacle apparatus, comprising: (a) two auxiliary lenses; (b) a hole in each lens; (c) an auxiliary bridge extending between and connecting the auxiliary lenses to each other; (d) an attachment for attaching the auxiliary spectacle to a primary spectacle; and (e) lens rivets extending from the auxiliary bridges through the holes to secure the lenses to the bridge. In a further embodiment, the lens rivets extend rearward from the auxiliary bridge. The lens rivets may terminate in a bulb.

The invention also provides an auxiliary spectacle bridge, comprising a bridge having: (a) lateral ends; (b) an attachment for attaching the auxiliary spectacle to a primary spectacle; and (c) lens rivets extending horizontally from the lateral ends. In a further embodiment, the lens rivets extend rearward from the auxiliary bridge.

BRIEF DESCRIPTION OF THE DRAWINGS

A preferred embodiment of the invention will be described with reference to the accompanying drawings, in which.

DETAILED DESCRIPTION OF EMBODIMENTS

Figure 1:
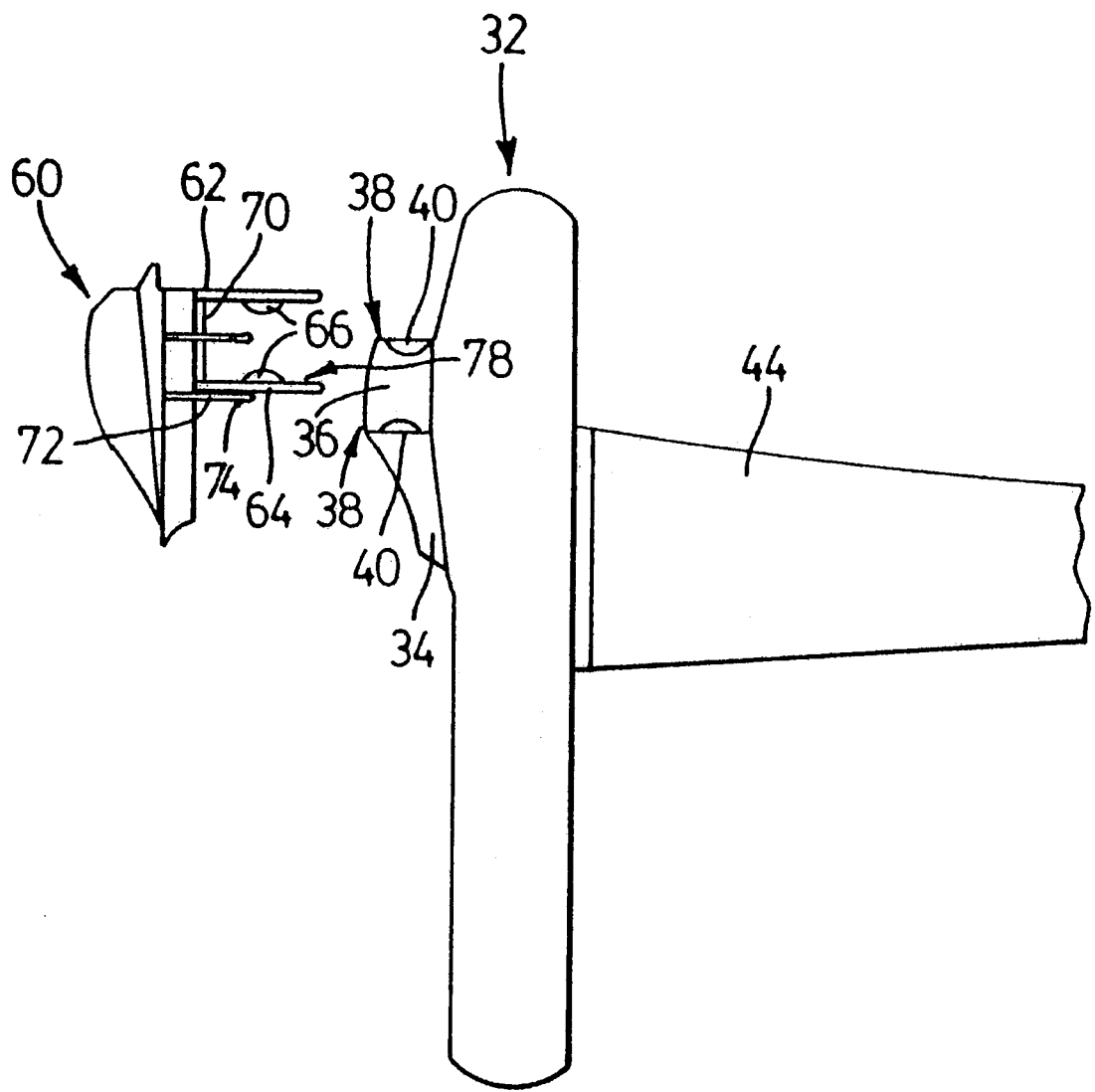
FIG. 1 is a side view of a disassembled primary spectacle and auxiliary bridge according to the present invention.

Preferred embodiments of the present invention will now be described in detail with reference to the appended drawings, in which like elements are denoted by like reference numerals.

As shown in FIG. 1, the spectacle apparatus of the present invention has an auxiliary bridge 60 for releasably attaching to a primary frame 32. FIG. 1 shows the apparatus in a dissembled form, with the auxiliary lenses removed in order to better show detail on auxiliary bridge 60.

The primary frame 32 is configured to be worn on the head of the wearer by means of the stems 44, which fit over a wearer ears to support the spectacles. Primary frame 32 includes a bridge 34 which has a ridge 36. Ridge 36 has a ridge front face 38 and indentations 40. At least one indentation 40 must be present for the effective operation of the apparatus. In the embodiment shown, two indentations 40 are present, one at the top and one at the bottom of the ridge. The ridge 36 and indentation 40 are configured to releasably engage with the auxiliary bridge 60.

Auxiliary bridge 60 has an upper projection 62 and a lower projection 64. At least one of projections 62 and 64 have a protrusion 66 which is configured to releasably fit into indentation 40. In the embodiment shown, two protrusions 66 are present, one at the top and one at the bottom of the ridge.

Figure 2:
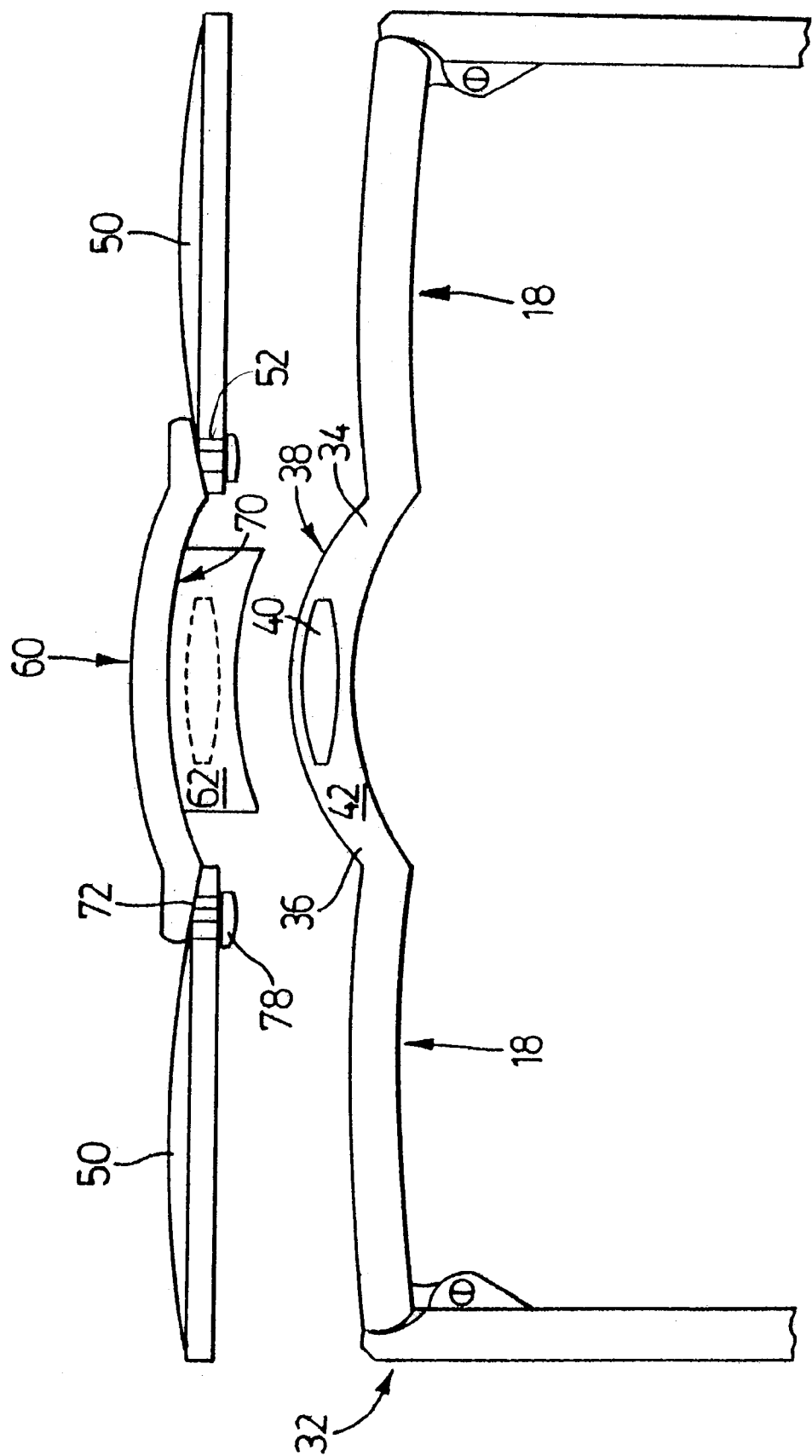
FIG. 2 is a top view of a disassembled spectacle apparatus according to the present invention.

Turning to FIG. 2, primary frame 32 includes a primary bridge 34 which is medial within the frame and which extends between and connects primary lenses 18. The primary frame 32 provides retaining structure for primary lenses 18. Primary lenses 18 may be clear or slightly tinted glass or plastic material. One or both primary lenses 18 may be shaped to the wearer's visual deficiencies.

The auxiliary spectacle 20, when assembled, is a one-piece unit. The auxiliary lenses 50 are configured to cover both of the primary lenses 18. The external shape of the auxiliary lenses 50 generally correspond with the external shape of the primary lenses 18. One use for the auxiliary lenses 50 is to provide protection to the wearer from sunlight and other vision-damaging elements. Therefore, the auxiliary lenses 50 may be tinted, and may also include a material therein or a coating thereon to filter ultraviolet light or other specific wavelengths of light.

Auxiliary spectacles 20 comprise an auxiliary bridge 60 which provides a retaining means for auxiliary lenses 50. As shown in FIG. 1, auxiliary bridge 60 has lens rivets 72 which terminate in bulb 74. When assembled, lens rivets 72 extend horizontally through holes in lenses 50. Lens rivets 72 terminate in bulb 74. Bulb 74 provides security of attachment of lenses 50 to auxiliary bridge 60. Bulb 74 may be present during assembly of lenses 50 to auxiliary bridge 60, or it may be formed or partially deformed upon assembly, to increase the security of attachment.

Auxiliary bridge 60 may be made of any flexible material with a plastic memory. In embodiments of the invention, auxiliary bridge 60 is made with Polyflex™ (Hyundai Optical Co., Inchon City, Korea) or memory plastic. Memory plastic and Polyflex™ are lightweight plastics that can be bent or stretched without losing their original shape. Polyflex™ is particularly resilient in this regard. By use of such materials, the clipping apparatus between the auxiliary bridge 60 and primary bridge 34 may be used repeatedly without any deformation of shape or degradation of security of attachment. Such materials are also particularly suitable for the mechanical assembly of auxiliary bridge 60 and auxiliary lenses 50.

Figure 4:
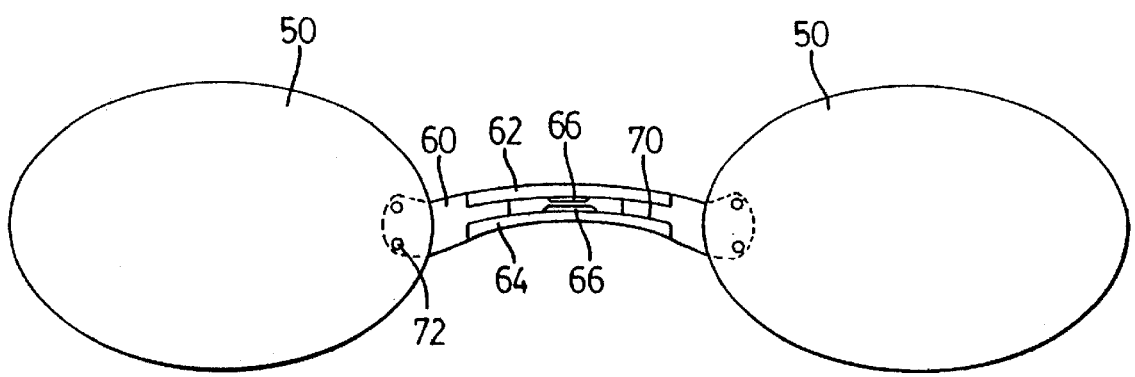
FIG. 4 is a rear view of auxiliary spectacles according to the present invention.

As best seen in FIG. 4, upon assembly of auxiliary bridge 60 and auxiliary lenses 50, lens rivet 72 is inserted through a hole 52 in each lens. By the use of Polyflex or memory plastic, this insertion may be carried out without risk of damage to the lenses. Bulb 74 is configured such that it is greater in diameter than hole 52 when not deformed. The use of such materials also allows for the insertion of bulb 74 through hole 52, by temporary deformation of bulb 74. Upon being inserted through hole 52, bulb 74 reestablishes, by plastic memory, its original diameter, thus securing lens 50 to auxiliary bridge 60, in an interference fit. The security of attachment may be increased by treating bulb 74 with a glue or other fixative after assembly, or by treating bulb 74 to compression forces which are great enough to permanently deform bulb 74, spreading it against the rear surface or lens 50 immediately around hole 52.

As best seen in FIG. 1, primary bridge 34 has a ridge front face 38 which forms a tight fit with auxiliary bridge face 70 when the auxiliary bridge is assembled with the primary spectacles. This tight fit prevents rotation of the bridge off its vertical axis, which could cause rattling when the assembled apparatus of the invention is being used by a wearer during vigorous activity.

As best seen in FIG. 2, ridge front face 38 extends parallel, and forms a tight fit with auxiliary bridge face 70 which also extends parallel, when the auxiliary bridge is assembled with the primary spectacles. Again, this tight fit prevents rotation of the bridge off its vertical axis, which could cause rattling when the assembled apparatus of the invention is being used by a wearer during vigorous activity.

Figure 3:
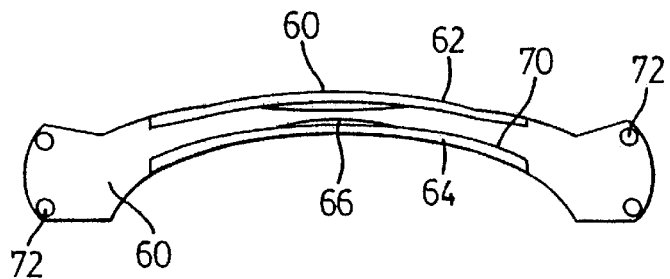
FIG. 3 is a rear view of an auxiliary bridge according to the present invention
Figure 5:
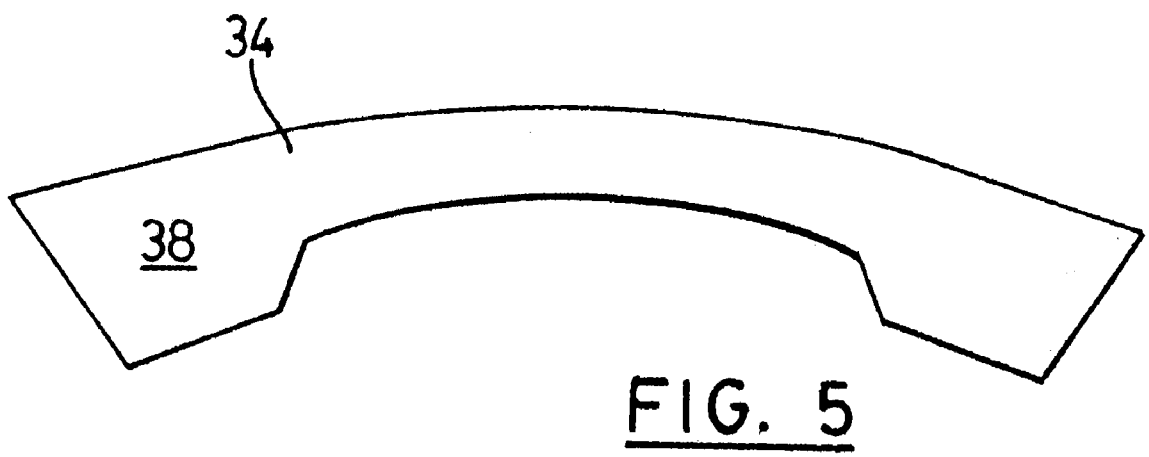
FIG. 5 is a front view of a primary bridge according to the present invention.

As best seen in FIG. 1 and FIG. 2, primary bridge 34 has a ridge vertical face 38 which forms a tight fit with projection face 68 when the auxiliary bridge is assembled with the primary spectacles. This tight fit prevents rotation of the bridge off its horizontal axis, which could cause rattling when the assembled apparatus of the invention is being used by a wearer during vigorous activity. As best seen in FIG. 3 and FIG. 5, a curvature exists in the shape of primary bridge 34 which corresponds to a curvature in the shape of auxiliary bridge 60. When assembled, these corresponding curvatures form a tight fit which further prevents rotation of the bridge off its horizontal axis.

As best seen in FIG. 2, protrusion 66 (shown using a dotted line, as it is underneath protrusion 62) extends lengthwise in correspondence with indentation 40. Thus, when assembled, protrusion 66 forms a tight fit with indentation 40 when the auxiliary bridge is assembled with the primary spectacles. This tight fit prevents rotation of the bridge off its vertical axis. Thus it can be seen that the mechanical clamping of the protrusion/indentation system of the present invention provides an exceptional security of fit on all axis, that is not provided by the prior art.

As seen in FIG. 1, FIG. 2 and FIG. 5, primary bridge 34 is constructed such that there is physical obstruction created by the shape of primary bridge 32 corresponding to auxiliary bridge 60. This obstruction is not only horizontal, i.e., the interference between primary bridge 34 and auxiliary bridge 60 prevents the auxiliary spectacles from moving downward, but also vertical. This ensures a more secure attachment between the auxiliary spectacles 20 and the primary frame 32.

By using the multiple interference fits described herein between the auxiliary and primary bridges, auxiliary spectacles 20 are less likely to collide with primary lenses 18 during physical activity. This prevents an annoying rattling noise between the auxiliary spectacles 20 and primary spectacles 42 and also reduces the risk of scratching or otherwise damaging the lenses by reducing contact between primary lenses 18 and auxiliary spectacles 20. The risk of accidental detachment of the auxiliary spectacles is also greatly reduced. A bump or collision which dislodges other, known apparatus will not give rise to the present auxiliary spectacles detaching from the primary spectacles, because of the multiple interference fits described herein.

When the fastening apparatus of the invention is engaged, auxiliary lenses 50 are located proximal to primary lenses 18, so that a minimum amount of light may enter the between the respective lenses.

Because projections 62,64 and ridge 36 project outwardly from the respective frames, no recesses are required in the frames, which would weaken the frames. Furthermore, by avoiding the use of recesses in the fastening apparatus, one is provided with an auxiliary spectacle which can be easily removed and replaced on the primary spectacles, without any flexing or bending of the frames or bridges and without engaging auxiliary spectacle 20 at difficult angles in relation to primary frame 32.

In the embodiment shown, protrusions 66 are beveled. Beveling the protrusions facilitates the ease of attaching and removing the auxiliary spectacles from the primary spectacles.

It will thus be appreciated that the present invention provides a secure method of attaching auxiliary spectacles to primary spectacles without sacrificing the ease with which one can remove and replace the auxiliary spectacles. Removal and replacement can be done with one hand, without the use of awkward angles of engagement and disengagement.

The use of a mechanical means of securing attachment, as opposed to a magnetic means, provides significant benefits. First, in producing the apparatus, the auxiliary bridge and the primary frame may be cast from a desired material, and is then ready for assembly. No drilling or puncturing is required to produce holes for insertion of magnets. No magnets or other additional pieces are required, and no fixative is required to install the means for securing attachment. As the apparatus for securing attachment of the present invention is a "unibody" design, the apparatus will not become loose or fall out with the passage of time and the weathering effect of changes in temperature and humidity.

Another benefit of the present means of attaching the auxiliary bridge to the auxiliary lenses is that no lens frames are required for the auxiliary lenses, thus decreasing the weight of the auxiliary spectacles and decreasing the cost of producing the auxiliary spectacles.

The above-detailed description with reference to the illustrations is considered to be illustrative and not restrictive in character. Modifications and variations on the embodiments described may be made within the scope of the invention. For example, the auxiliary lenses 50 may also be used for magnification of vision. In this case, the auxiliary lenses 50 would be fashioned in the same manner as a magnifying glass and fit onto the primary lenses 18, which may or may not be prescription lenses. The auxiliary lenses 30 would then enlarge small or intricate details to make them more readily observable, so as to reduce the strain on the eyesight of the wearer. The auxiliary lenses 30 may also have decorations thereon to be viewed by observers of the wearer, to enhance the appearance of the lenses or for amusement purposes.

In another embodiment, the present invention also contemplates primary spectacles 42 which contain no primary lense 18. This embodiment would be useful in the circumstances wherein the user desires to remove and replace the auxiliary lenses 50, but does not require the primary lenses 18 for assisting vision. For example, this embodiment would be useful in the context of welding, wherein very dark lenses are required during the welding, but between welding, it may be desirable to have no lenses on. As another example, where an individual suffers from a visual defect which makes reading difficult, it may be desirable to have no lenses except when reading.

In the embodiment shown, the lateral shape of projections 62 and 64 and corresponding lateral shape of ridge 36 prevents horizontal movement of the assembled apparatus. However, in other embodiments (not shown) horizontal movement could be prevented by supplying two of each of protrusions 62 and 64 set laterally apart and corresponding to ridge 36.

As best seen in FIG. 1, FIG. 2 and FIG. 5, primary bridge 34 has at least one indentation 40 on ridge 36. In the embodiment shown, indentations 40 are found at the top and bottom of ridge 36. In other embodiments (not shown), only one indentation 40 may be present. In a further embodiment (not shown), a singular indentation 40 may comprise a hole extending vertically through ridge 36.

It is to be understood that only the preferred embodiments have been shown, and that modifications thereof would be readily apparent to one skilled in the art. Therefore, the true scope and spirit of the invention resides in the appended claims and their legal equivalents, rather than by the given examples.

I claim:

1. A spectacle apparatus, comprising:
   (a) a primary frame adapted for fitting on a wearer's head, said primary frame having a primary bridge medial in said primary frame;
   (b) a ridge extending forward from said primary bridge;
   (c) an indentation on a horizontal surface on said ridge;
   (d) two auxiliary lenses;
   (e) an auxiliary bridge extending between and connecting said auxiliary lenses to each other;
   (f) an upper projection extending rearward from said auxiliary bridge and a lower projection extending rearward from said auxiliary bridge; and
   (g) at least one protrusion on at least one of said projections, said protrusion configured for releasably inserting into said indentation, and said at least one said projection is elastic.

2. A spectacle apparatus as claimed in claim 1, comprising said protrusions on both said projections, said protrusions configured for releasably inserting into at least one indentation on said ridge.

3. A spectacle apparatus as claimed in claim 2 wherein said at least one indentation on said ridge is a hole through said ridge.

4. A spectacle apparatus as claimed in claim 1, wherein said indentation on said ridge extends laterally.

5. A spectacle apparatus as claimed in claim 4, wherein at least one said protrusion extends laterally in correspondence with said indentation for releasably inserting into said indentation.

6. A spectacle apparatus as claimed in claim 4, comprising protrusions on both said projections, and wherein said protrusions extend laterally in correspondence with at least one said indentation for releasably inserting into said indentation.

7. A spectacle apparatus as claimed in claim 1 wherein said ridge has a ridge vertical face which extends laterally and said auxiliary bridge has an rearward vertical auxiliary bridge face which extends laterally and said faces are configured such that an interference fit between said faces prevents horizontal rotation between said primary spectacle and said auxiliary bridge.

8. A spectacle apparatus as claimed in claim 1 wherein said ridge has a horizontal ridge face which extends laterally and at least one said projection has a projection face which extends laterally and said faces are configured such that an interference fit between said faces prevents vertical rotation between said primary spectacle and said auxiliary bridge.

9. A spectacle apparatus as claimed in claim 7 wherein said ridge has a horizontal ridge face which extends laterally and at least one said projection has a projection face which extends laterally and said faces are configured such that an interference fit between said faces prevents vertical rotation between said primary spectacle and said auxiliary bridge.

10. A spectacle apparatus as claimed in claim 1 wherein said protrusion is beveled.

11. An auxiliary spectacle apparatus as claimed in claim 1, wherein said auxiliary bridge is Polyflex™ plastic or memory plastic.

* * * * *